United States Patent
Thomas et al.

(10) Patent No.: US 11,455,527 B2
(45) Date of Patent: Sep. 27, 2022

(54) CLASSIFICATION OF SPARSELY LABELED TEXT DOCUMENTS WHILE PRESERVING SEMANTICS

(71) Applicant: International Business Machines Corporation, Armonk, NY (US)

(72) Inventors: John J. Thomas, Fishkill, NY (US); Aleksandr E. Petrov, Acton, MA (US); Wanting Wang, White Plains, NY (US); Maxime Allard, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 16/441,927

(22) Filed: Jun. 14, 2019

(65) Prior Publication Data

US 2020/0394509 A1 Dec. 17, 2020

(51) Int. Cl.
- *G06N 3/08* (2006.01)
- *G06F 17/15* (2006.01)
- *G06N 3/04* (2006.01)
- *G06F 40/30* (2020.01)

(52) U.S. Cl.
CPC .............. *G06N 3/08* (2013.01); *G06F 17/15* (2013.01); *G06F 40/30* (2020.01); *G06N 3/0472* (2013.01)

(58) Field of Classification Search
CPC ........ G06N 3/08; G06N 3/0472; G06F 40/30; G06F 17/15
See application file for complete search history.

(56) References Cited

U.S. PATENT DOCUMENTS

| | | | |
|---|---|---|---|
| 10,769,503 B1* | 9/2020 | Buhler | G06K 9/6215 |
| 2018/0240012 A1 | 8/2018 | Bhatt et al. | |
| 2018/0285740 A1 | 10/2018 | Smyth et al. | |
| 2019/0223983 A1* | 7/2019 | Mah | G06K 9/6277 |

(Continued)

FOREIGN PATENT DOCUMENTS

| CN | 108549646 A | 9/2018 |
|---|---|---|
| CN | 109241283 A | 1/2019 |

(Continued)

OTHER PUBLICATIONS

Hinton, G.E., et al., Transforming Auto-encoders, International Conference on Artificial Neural Networks (ICANN), Dec. 2011, pp. 1-8.

(Continued)

*Primary Examiner* — Kevin Ky
(74) *Attorney, Agent, or Firm* — Jorge Maranto; Otterstedt & Kammer PLLC

(57) ABSTRACT

A method of training a neural network includes receiving a text corpus containing a labeled portion and an unlabeled portion, extracting local n-gram features and a sequence of the local n-gram features from the text corpus, processing the text corpus, using convolutional layers, according to the local n-gram features to determine capsule parameters of capsules configured to preserve the sequence of the local n-gram features, performing a forward-oriented dynamic routing between the capsules using the capsule parameters to extract global characteristics of the text corpus, and processing the text corpus according to the global characteristics using a long short-term memory layer to extract global sequential text dependencies from the text corpus, wherein parameters of the neural network are updated according to the local n-gram features, the capsule parameters, global characteristics, and global sequential text dependencies.

15 Claims, 5 Drawing Sheets

(56) References Cited

U.S. PATENT DOCUMENTS

| | | | |
|---|---|---|---|
| 2020/0249674 A1* | 8/2020 | Dally | G05D 1/0088 |
| 2020/0250274 A1* | 8/2020 | Tan | G06N 20/00 |
| 2020/0269136 A1* | 8/2020 | Gurumurthy | G06N 20/00 |
| 2020/0311800 A1* | 10/2020 | Srinivasan | G06K 9/6253 |
| 2020/0320348 A1* | 10/2020 | Yang | G06V 10/82 |
| 2020/0327151 A1* | 10/2020 | Coquard | G06F 16/3347 |
| 2020/0364508 A1* | 11/2020 | Gurel | G06V 20/41 |
| 2020/0387798 A1* | 12/2020 | Hewage | G06N 3/088 |
| 2020/0394509 A1* | 12/2020 | Thomas | G06F 40/284 |
| 2022/0180119 A1* | 6/2022 | Kelton | G06K 9/623 |

FOREIGN PATENT DOCUMENTS

| | | |
|---|---|---|
| CN | 109241287 A | 1/2019 |
| CN | 109783794 A | 5/2019 |
| WO | WO201983553 A1 | 5/2019 |

OTHER PUBLICATIONS

Wang et al., An optimization view on dynamic routing between capsules, The Sixth International Conference on Learning Representations, May 2018, pp. 1-4.

Wang et al., Sentiment Analysis by Capsules, Proceedings of the 2018 World Wide Web Conference (WWW '18), International World Wide Web Conferences Steering Committee, May 2018, pp. 1165-1174.

Johnson et al., Supervised and Semi-Supervised Text Categorization using LSTM for Region Embeddings, Proceedings of the 33rd International Conference on Machine Learning, Feb. 2016, pp. 1-9.

Miyato et al., Adversarial Training Methods for Semi-Supervised Text Classification, Published as a conference paper at ICLR 2017, May 2017, pp. 1-11.

Zhou et al., A C-LSTM Neural Network for Text Classification, arXiv preprint arXiv: 1511.08630, Nov. 2015, pp. 1-10.

Sabour et al. Dynamic Routing Between Capsules, 31st Conference on Neural Information Processing Systems (NIPS) Oct. 2017, pp. 1-11.

Zhao et al., Investigating Capsule Networks with Dynamic Routing for Text Classification, Association for Computational Linguistics, Mar. 2018, pp. 1-12.

Miyato et al., Virtual Adversarial Training: A Regularization Method for Supervised and Semi-Supervised Learning, IEEE Transactions on Pattern Analysis and Machine Intelligence, Jun. 2018, pp. 1-16.

* cited by examiner

CLASSIFICATION OF SPARSELY LABELED TEXT DOCUMENTS WHILE PRESERVING SEMANTICS

BACKGROUND

The present disclosure relates generally to text classification, and more particularly to methods of training a text classifier system.

Conventional text classification applied techniques to understand documents, for example, to comply with regulatory requirements, to streamline internal operations, etc. These text classifiers typically require a high percentage of training data to be labeled in order to become performant. Therefore, the conventional text classification approaches face major challenges including high levels of manual labor involved in classifying these text documents.

SUMMARY

According to some embodiments of the present invention, a method of training a neural network to classify sparsely labeled text documents while preserving semantics includes receiving a text corpus containing a labeled portion and an unlabeled portion exceeding the labeled portion, extracting a plurality of local n-gram features and a sequence of the local n-gram features from the text corpus, processing the text corpus, using a plurality of convolutional layers, according to the local n-gram features to determine capsule parameters of a plurality of capsules configured to preserve the sequence of the local n-gram features, performing a forward-oriented dynamic routing between the plurality of capsules using the capsule parameters to extract a plurality of global characteristics of the text corpus, and processing the text corpus according to the global characteristics using a long short-term memory layer to extract a plurality of global sequential text dependencies from the text corpus, wherein a plurality of parameters of the neural network are updated according to the local n-gram features, the capsule parameters, global characteristics, and global sequential text dependencies.

According to one or more embodiments of the present invention, a neural network system executing on a computer system includes a first plurality of processing elements configured to extract a plurality of local features and a sequence of the local features from a text corpus, wherein the text corpus is sparsely labeled, a second plurality of processing elements configured to extract a plurality of global characteristics of a text corpus, wherein the processing elements are structured as capsules configured to preserve the sequence of the local features, and a third plurality of processing elements configured to extract a plurality of global sequential text dependencies from the text corpus given an output of the first plurality of processing elements, wherein the third plurality of processing elements are structured as a long short-term memory layer, which is configured to output a probability distribution over all labels generated by the first and second plurality of processing elements.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

a. forward-oriented dynamic routing, which preserves sequences and semantics in an input text;
b. extracting n-gram features (local features), document-global features, and sequence-dependent features together in one network; and
c. training a capsules network with virtual adversarial training to prevent over-fitting and improving the accuracy.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Figure 1:
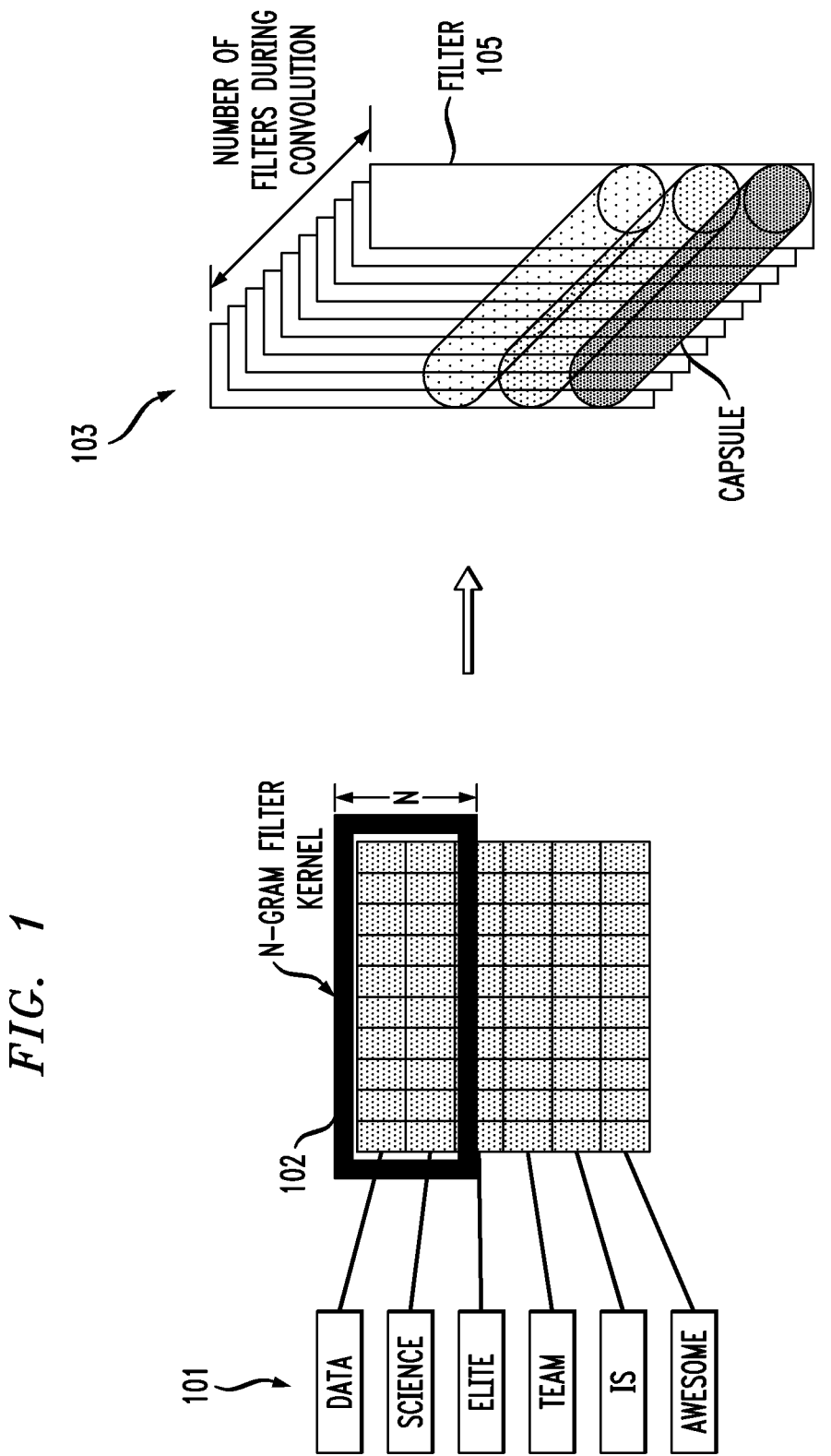
FIG. 1 is a diagram of a method of word embedding and capsules created with convolution according to one or more embodiments of the present invention.

Embodiments of the present invention are related to text classification, and more particularly to methods of training a neural network architecture embodying a natural language text classifier system. According to some embodiments of the present invention, the neural network architecture can be trained on sparsely labeled data sets, wherein the neural network architecture takes into consideration semantics of the text, and achieves improved performance. According to some embodiments, the neural network architecture is configured to process text-based data in which only a fraction of the text is labeled, such as when only a few documents are labeled within a class of documents. According to an embodiment of the present invention, the neural network architecture is configured to conserve semantics and sequential-dependencies of semantics identified inside the text, which can be used in classifying the text (e.g., identifying sentiment, identifying groups of documents, etc.).

According to some embodiments of the present invention, the labels are categorical, as compared to continuous labels. These labels can include any label that a user (e.g., human reader) wants to assign to a text (e.g., category, heading, sentiment, title, etc.).

According to one or more embodiments of the present invention, the natural language text classifier system classifies text-based data objects (e.g., documents, paragraphs, sentences, transcripts, etc.) into different categories. These categories are pre-defined such as category A, category B, category C, and so on, such that several different data objects may be classified as belonging to category A, category B or category C.

In some embodiments of the present invention, the functionality of the text classifier system can be implemented as a learning system that operates the neural network architecture, which is a machine learning architecture. Machine learning describes a function of electronic systems that learn from data. The neural network architecture can be trained to learn functional relationships between inputs and outputs that are currently unknown. The machine learning functionality of the neural network architecture to learn text classification using sparsely labeled data sets. According to some embodiments of the present invention, sparsely labeled data sets include a labeled portion and an unlabeled portion exceeding the labeled portion. According to at least one embodiment of the present invention, a sparsely labeled data set includes less than about 5 percent labeled data. It should be understood that at least some embodiments of the present invention are also applicable to data sets that are densely labeled.

Neural networks are inspired by biological neural networks. A typical neural network is configured as a set of convolutional layers, each layer comprising one or more neurons, wherein each neuron is connected to all the neurons of the neighboring layers. Each connection has a weight indicative of a relative strength of the connection.

A given layer of the neural network can be categorized as an input layer, a hidden layer, or an output layer. Each neural network has an input layer and an output layer, and some number of hidden layers therebetween. The neural network embodies a classifier, which is configured to make certain decisions at each boundary between two layers according to signals transmitted from the neurons of a predecessor layer to neurons on a successor layer and the weights on the connections connecting the two layers.

A neural network can be embodied as a neuromorphic system of interconnected processor elements (e.g., physical processors and/or virtual processor elements) that act as the neurons to exchange the signals. The connections in the neural network carry the signals between the processor elements or neurons. The weights on the connections are adjustable based, at least in part, on experience, making neural networks adaptive to inputs and capable of learning.

Embodiments of the text classifier include a neural network configured to classify sparsely labeled text documents while preserving semantics.

According to one or more embodiments of the present invention, an improved neural network architecture includes multiple layers of capsules that perform internal computations on their inputs and encapsulate the results of these computations into a vector of informative outputs. Each capsule learns to capture implicitly defined global features or entities (e.g., informative word sequences) over text including labeled and unlabeled text samples. Each capsule outputs a score indicative of whether its respective global feature is present within the text and captures mapping parameters that may include precise parameters of the global feature relative to an implicitly defined canonical version of the global feature. The score of the global feature present in the text is locally invariant, not changing for different instances of the global feature over a manifold of possible appearances within the limited domain covered by the capsule. The mapping parameters are equivariant, as the documents/text changes and the global feature moves over the appearance manifold, the mapping parameters change by a corresponding amount because they are representing the intrinsic coordinates of the global feature on the appearance manifold. One advantage of capsules that output explicit mapping parameters is that the capsules provide a way to recognize wholes (i.e., entities) by recognizing their parts.

According to an embodiment of the present invention, an improved neural network architecture is configured to classify text by capturing n-gram features (local) inside one or more documents (i.e., original text) with convolutional layers restructured into (layers of) capsules, in addition to sequential features that are captured with a long short-term memory layer.

It should be understood that n-gram features refer to a contiguous sequence of n items from a given sample of text. The items can be phonemes, syllables, letters, words or base pairs according to the application. Typically, in an n-gram language model, the probability of a word is conditioned on some number of previous words and can be described as following a categorical distribution.

Typically, a convolutional neural network (CNN) is a feedforward neural network with convolution layers interleaved with pooling layers. The convolutional neural network was originally developed for image processing (e.g., implemented as image filters to blur or sharpen images). According to an embodiment of the present invention, and in the field of text classification, a convolution layer captures features in a plurality of small regions of data (e.g., a particular n-gram feature) and at every location the corresponding feature is converted to a low-dimensional vector with information relevant to the task being preserved, which is termed convolutional mapping herein. The mapping is shared among all the locations, so that useful features can be detected irrespective of their locations. A document in the input text can be represented as a sequence of dense vectors, with each vector representing a word in a multi-dimensional space, and a convolution layer converting small regions of the document (e.g., a particular n-gram feature) to low-dimensional vectors at every location (which is the convolutional mapping of text regions). According to one or more embodiments of the present invention, an improved neural network architecture does not include pooling layers.

A capsule is a group of neurons whose activity vector represents instantiation parameters of a specific type of entity, in this case, a particular n-gram feature. The convolutional layers extract semantic features out of a small amount of labeled data. In addition, global features are extracted by restructuring the convolutional layers into capsule layers (see FIG. 1), and a forward oriented dynamic routing is performed between a first capsule layer and a second capsule layer (see FIG. 2). The connections between the first and second capsule layers, and each connection's weight, enable the extraction of sequential and semantic features from the input text.

Referring to the forward-oriented dynamic routing between layers of capsules, which captures global characteristics of the input text, each capsule is a group of neurons whose activity vector represents the instantiation parameters of a corresponding one of the n-gram features. The length of the activity vector represents a probability that the entity is present in the text. Active capsules at one layer make predictions, via transformation matrices, for the instantiation parameters of higher-layer capsules. When multiple predictions agree, a higher layer capsule becomes active. According to some embodiments of the present invention, the connections between the capsule layers are defined in such a way (i.e., configured for forward-oriented dynamic routing) that a capsule in the higher layer does not receive input from capsules that are coming later in the sequence of the lower layer. Accordingly, the forward-oriented dynamic routing preserves a sequence in the higher capsule layer.

According to some embodiments, the (trained) neural network architecture can be generalized with virtual adversarial training and unlabeled data to prevent over-fitting and make the neural network more accurate on not seen data. In general terms, adversarial training provides a means of regularizing supervised learning methods, and virtual adversarial training extends supervised learning algorithms to the semi-supervised setting. According to some embodiments of the present invention, the virtual adversarial training includes applying perturbations to word embeddings in the trained neural network, such that the trained neural network learns to make the perturbations insignificant to the classification.

Embodiments of the present invention, a category of the input text is predicted by the neural network architecture implementing a text classifier when trained with only few labeled documents per class; implementations support an approach to reading text that maintains relationships and semantics of the original text.

According to one or more embodiments of the present invention, a neural network architecture implementing a text classifier can be applied to data science and artificial intelligence (AI) engagements including analytics on large corpora of documents, such as processing call center transcripts, large volumes of text on complaints, controls, issues, etc. By way of a non-limiting example, a large corpora can range from thousands to millions of documents, and is impractically large for human processing (e.g., due to time constraints).

Figure 2:
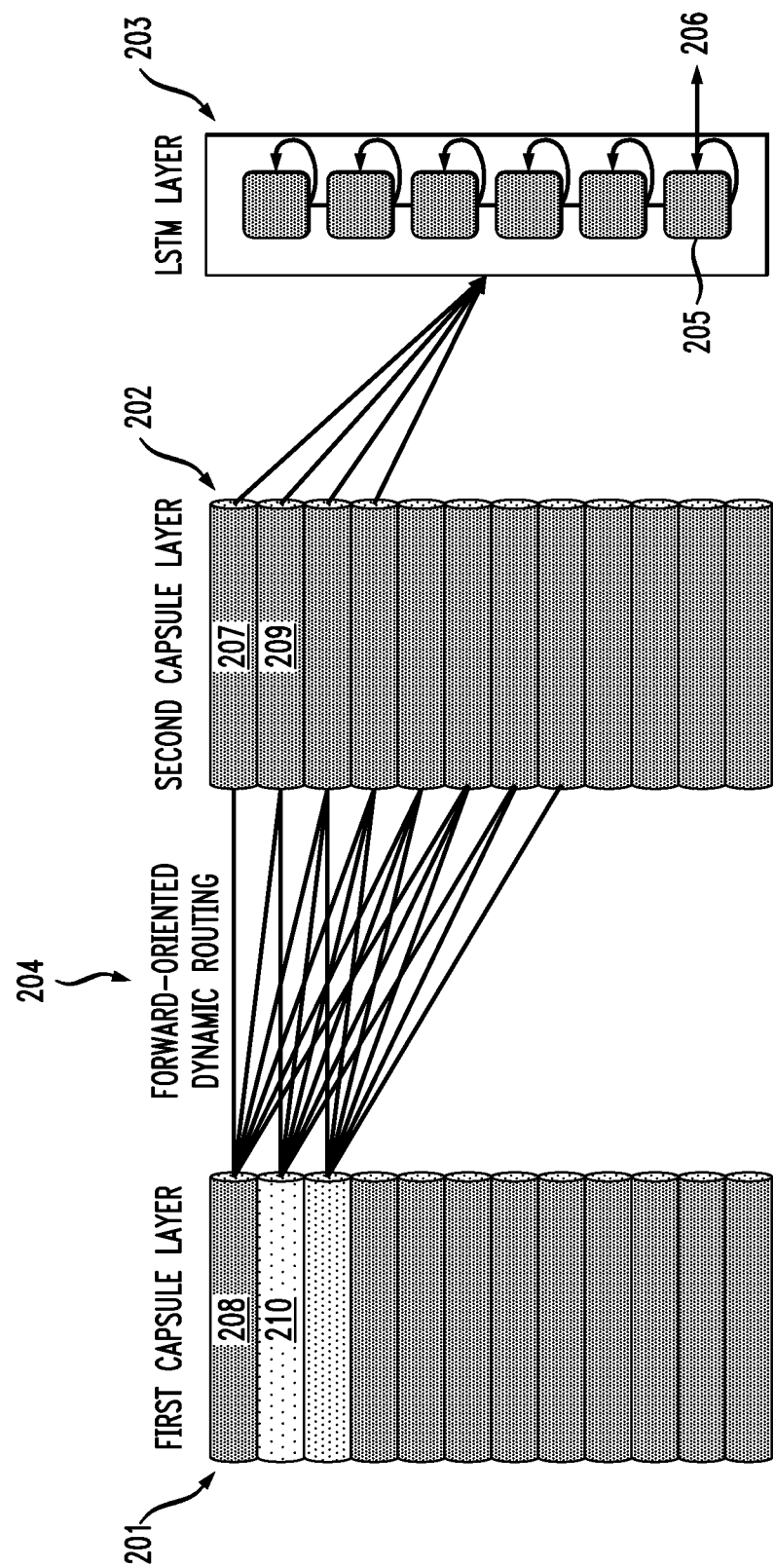
FIG. 2 is a diagram of a method of forward dynamic routing between two capsule layers and an long short-term memory layer according to some embodiments of the present invention.

Referring to FIG. 1, according to an embodiment of the present invention, a neural network architecture is configured to classify input text 101 (e.g., "Data Science Elite Team is awesome.") by capturing n-gram features 102 (local) inside documents with convolutional filters 103 restructured into capsules 104 used to capture global features of the text, in addition to sequential features that are captured with a long short-term memory layer (see 203, FIG. 2). Stated another way, the neural network architecture includes neurons having connections (and weights on those connections) forming the convolutional filters, and capsules nested within the convolutional filters having weights of their own (i.e., capsule parameters). It should be understood that each layer of the convolutional network 103 represents all of the n-gram features for one convolutional mapping (i.e., one filter, e.g., filter 105). Within the convolutional filters, one capsule (e.g., capsule 104) represents one entity (e.g., one local feature). These layers (i.e., the convolutional layers 103 including the capsules, e.g., 104, and the long short-term memory layer 203) effectively extract local features, global features and semantic features out of a small amount of labeled data, which enables categorization of the input text.

According to one or more embodiments of the present invention, a single neural network architecture is configured to extract the n-gram features (local features), document-global features, and sequence-dependent features together using capsules (within the convolutional layers) and the long short-term memory layer. In addition, the global features (e.g., document-global features) are extracted by restructuring the convolutional layers into capsule layers (see FIG. 1), and performing a forward oriented dynamic routing (see 204, FIG. 2) connecting a first capsule layer 201 and a second capsule layer 202. It should be understood that the capsules of the second capsule layer are trainable vectors similar in structure to the first capsule layer. According to some embodiments of the present invention, in the forward-oriented dynamic routing 204, which preserves sequences and semantics, the input of each capsule in the second layer 202 is composed of the outputs of the capsules in the first layers 201. Each capsule in the second layer 202 will only use the outputs of the matching capsule in the first layer 201 and those capsules preceding the matching capsule in that layer (1 to (n−1)'th). The n'th capsule in the first layer is the matching capsule of the n'th capsule in the second layer.

In view of the foregoing, and as can be seen in FIG. 2, a first capsule 207 of the second capsule layer 202 receives only one input (i.e., from a first capsule 208 of the first capsule layer 201). Similarly, a second capsule 209 of the second capsule layer 202 receives two inputs (i.e., from the first and second capsules 208 and 210 of the first capsule layer 201).

The connections between the first and second layer of capsules, and the capsule weights thereof (i.e., parameters), enables the extraction of sequential and semantic features of the original text. It should be understood that sequential features capture a sequence of a given text. According to some embodiments of the present invention, textual content is recognized as sequential content, such that the sequential nature of the text is important to preserve and extract. Further, it should be understood that semantic features capture the meaning of text and words in their given context.

According to some embodiments, the neural network architecture is generalized (see 308, FIG. 3) with virtual adversarial training and unlabeled data to prevent over-fitting and make it more accurate on not seen data. According to one or more embodiments of the present invention, the generalization 308 is a training of the neural network weights (including adaptation of the convolutional filters, the capsule parameters and long short-term memory) with the virtual adversarial training, which can prevent over-fitting the neural network architecture to the labeled data and improves the accuracy of the neural network architecture.

Figure 3:
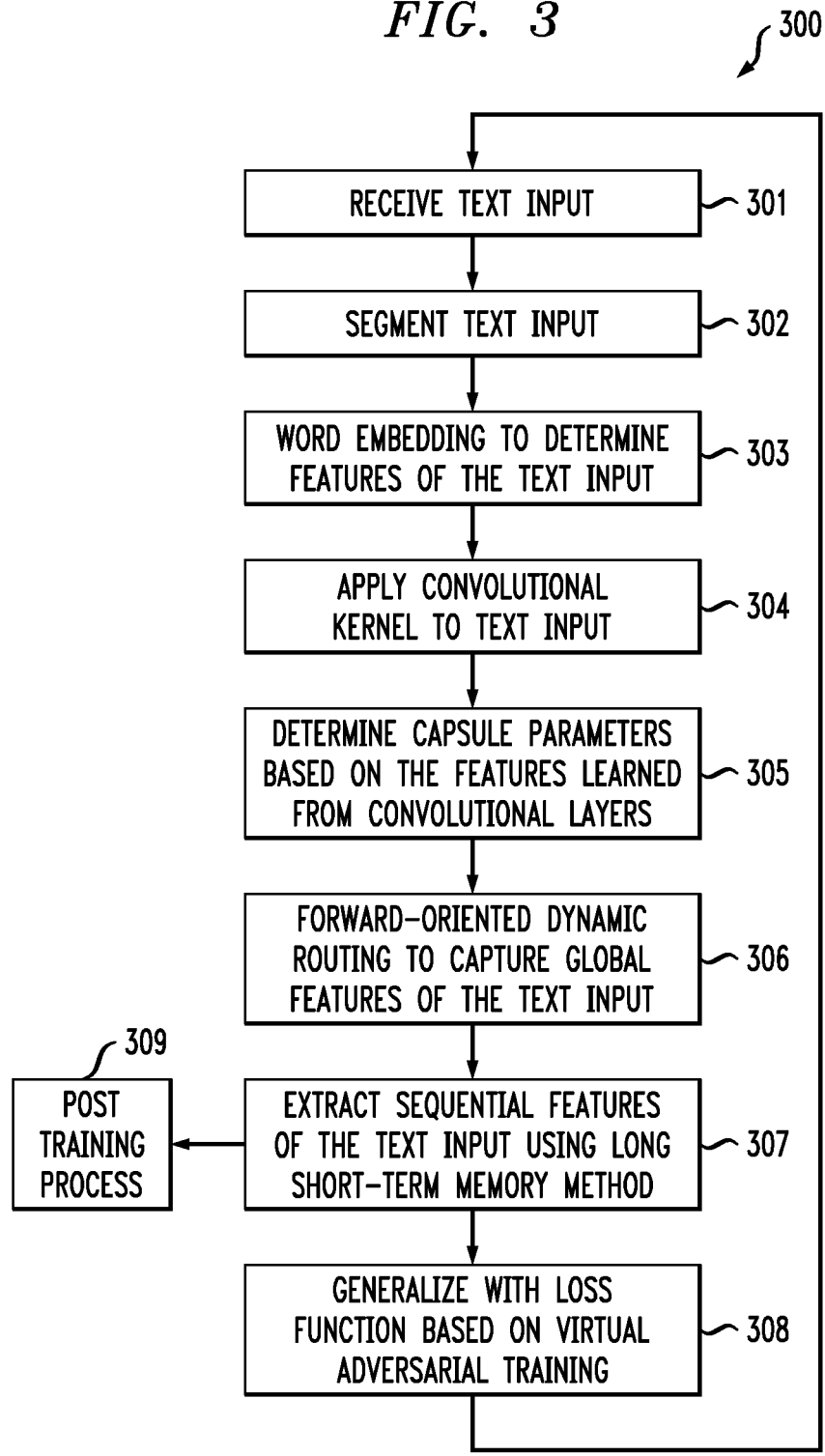
FIG. 3 is a flow diagram of a method for processing and labeling text using a neural network according to an embodiment of the present invention.

According to an embodiment of the present invention and referring to FIG. 3, given a corpus of unlabeled and labeled text documents 301 to train a neural network based text classifier, the text is reduced to text segments 302 from the unlabeled and labeled text, which are used as input into a word embedding layer 303. The word embedding layer 303 maps the words into a m-dimensional space (illustrated as 102 in FIG. 1), transforming the text into a numerical values. In one exemplary case, 256 dimensions can be used. The number of dimensions can be a free parameter to be selected for a given application. Note that the word embedding 303 determines the n-gram (e.g., 3-gram) features from the text segments. A plurality of different filters (e.g., 200 filters) are determined by applying different convolutional kernels (filters) of the same size 304, where each of the convolutional kernels has the width of the word embedding (256 in the exemplary case) and a specific height (e.g., n=3). The convolutional kernels (filters) extract and learn entity features from the text 305. The learned entity features are input vectors to the capsules. Stated another way, the outputs of the convolutional layers' neurons are re-organized into the capsules—see 104, FIG. 1—such that the capsules accurately represent the learned entities. According to some embodiments of the present invention, each vector represents an entity (e.g., an n-gram feature), while still keeping the sequential order of those entities, which are local features. Accordingly, the vectors define the capsules at block 305. It should be understood that the sequence of capsules (e.g., shown as a top-down sequence in FIG. 2) corresponds to the sequence of entities discovered by the sliding window during segmentation, thereby maintaining a record of the sequential order of the entities discovered in the input text. In another example, as illustrated in FIG. 1, the n-gram filter kernel 102 can correspond to a first entity discovered in the input text "Data Science Elite Team is awesome." This first discovered entity could be a first or top capsule of a capsule layer.

Through forward-oriented dynamic routing 306, the entity (e.g., n-gram) features of the first capsule layer 201 are communicated to a second capsule layer 202. The latter capsule layer comprises a set of capsules that are connected to the first layer by forward-oriented dynamic routing. The second capsule layer has the same structure as the first layer. The forward-oriented dynamic routing between those two capsule layers captures global characteristics of the text, before the output of the second capsule layer is communicated to the long short-term memory layer 203. According to one or more embodiments of the present invention, the connections between the capsule layers are defined such that a capsule in the second layer does not receive input from capsules that are coming later in the sequence. This preserves a sequence in the second capsule layer. The long short-term memory layer 203 extracts sequential features of the text 307.

It should be understood that the method 300 of FIG. 3 processes the text at each of blocks 303, 306, and 307 based on local features of the text, global features of the text, and semantic features of the text, respectively, updating parameters of the neural network based on the processes at these blocks. It should be understood that once the neural network has been trained, the parameters of the neural network are frozen and that a new corpus of text can be processed using the neural network for additional purposes 309, e.g., to identify groups of documents based on the categorizations, etc. That is, the trained neural network can be applied to new text in a text categorization task. According to some embodiments, the post training process 309 can include a validation process, which can validate the learned parameters; that is, the output the neural network can be communicated to another computer system.

One of ordinary skill in the art would recognize that the segmentation of the text 302 can be performed using any of a variety of known methods. For example, the text segmentation 302 can include generating segments of x utterances in length (e.g., 100 characters) using a sliding window (e.g., one utterance shift for the slide). In some embodiments, the generated segments can be tokenized and lemmatized (i.e., grouping variant forms of the same word), stop words (e.g., "the," "is," and "are") can be removed, and n-gram phrases are generated where co-occurring tokens with high frequency are combined together (such as "credit card," "debit card," "account," "amount," etc.). In some embodiments, co-occurring terms such as "thank you" can be dropped during stop word removal. According to at least one an exemplary embodiment of the present invention, word embedding includes creating feature vectors for each segment at 303.

One of ordinary skill in the art would appreciate that long short-term memory (LSTM) is an artificial recurrent neural network (RNN) architecture. An exemplary long short-term memory layer comprises a plurality of units, e.g., 205, comprising a cell, an input gate, an output gate and a forget gate. A cell remembers values over arbitrary time intervals and the three gates regulate the flow of information into and out of the cell. Stated another way, in a typical long short-term memory, the cell tracks dependencies between elements in the input sequence, the input gate controls the extent to which a new value flows into the cell, the forget gate controls the extent to which a value remains in the cell and the output gate controls the extent to which the value in the cell is used to determine an output activation of the long short-term memory. Connections into and out of the gates are weighted. The weights are learned during training and determine how the gates operate. Embodiments of the present invention are not limited to the exemplary structure of the long short-term memory described herein; variations on the structure of a long short-term memory unit are contemplated and would be understood by one or ordinary skill in the art.

According to some embodiments of the present invention, a loss function is used to optimize the neural network by reducing (e.g., minimizing) the loss function of the system. Optimization is used to find the parameters of the system that reduce (e.g., minimize) value of the loss function, which is indicative of how well the system approximates a solution during training.

According to an embodiment of the present invention, the output 206 of a last long short-term memory cell 205 is a probability distribution over the labels that in turn is used by the loss function. Depending on whether the input (e.g., 101, FIG. 1) is labeled or unlabeled, different loss functions are used and summed at the end of each iteration. In this context, one iteration comprises text data being fed into the system and used for a training cycle. After this iteration, the optimizer uses the output of the loss function to improve the parameters of the neural network (e.g., the trainable weights including the mapping parameters, weights on neurons of the convolutional filters, weights of the capsules and weights in the long short-term memory layer) of the system. These iterations (i.e., receive new text data and improve the parameters) are repeated a plurality of times as the neural network learns from the training text data. Labeled input is processed using a cross-entropy loss and unlabeled input is processed using the virtual adversarial loss function. According to some embodiments, the loss function is optimized using an optimizer (e.g., the Adam Optimizer, which is an adaptation of gradient descent optimization) to improve the parameters of the system. According to one or more embodiments of the present invention, the neural network requires labeled and unlabeled data as input in every iteration.

The virtual adversarial loss function leverages the unlabeled data by using the predicted logits that were inferred by the neural network. The virtual adversarial loss function perturbs the word embedding layer such that the divergence between the perturbed and non-perturbed logits are increased (e.g., maximized).

Embodiments of the present invention are not confined to a strict semi-supervised setting; embodiments can also be used in a supervised setting.

According to an exemplary implementation of one or more embodiments, in the context of a company having multiple managing programs with different controls (text descriptions) for given risks, theses controls have different attributes and different taxonomies. One managing group/program might have a special taxonomy that is not used by the other managing programs, but the company may want to extend this taxonomy to all the controls written by all the programs.

One problem in this case is that this one managing program has a limited amount of labeled data and when comparing that to all the existing controls, and the labeled data makes up a small percentage of the total data. Training a neural network on only the labeled data from that program/group will result in a poor model. According to some embodiments of the present invention, when all of the data (unlabeled and labeled) can be taken into account for the training the neural network, the resulting neural network will be much more powerful and general. The neural network can be implemented as a powerful text-classifier, configured to extend this specific taxonomy to all the controls inside the company.

By capturing local, global and sequential features of the controls (text descriptions) the neural network is able to capture additional details (e.g., a categorization of the text) in both the labeled data and the unlabeled data. According to some embodiments, the available categories of the text are predefined for a particular application. For example, a system operated according to embodiments of the present invention may categorize customer complaints by type (e.g., sentiment) or severity, identified groups (e.g., groups of customers interesting a different products or services), groups users of a system according to a hierarchy, etc. It should be understood that embodiments described herein are non-limited and exemplary of categorizations that are achievable. One of ordinary skill in the art would understand that a neural network according to embodiments of the present invention can be implemented for a variety of applications.

Figure 4:
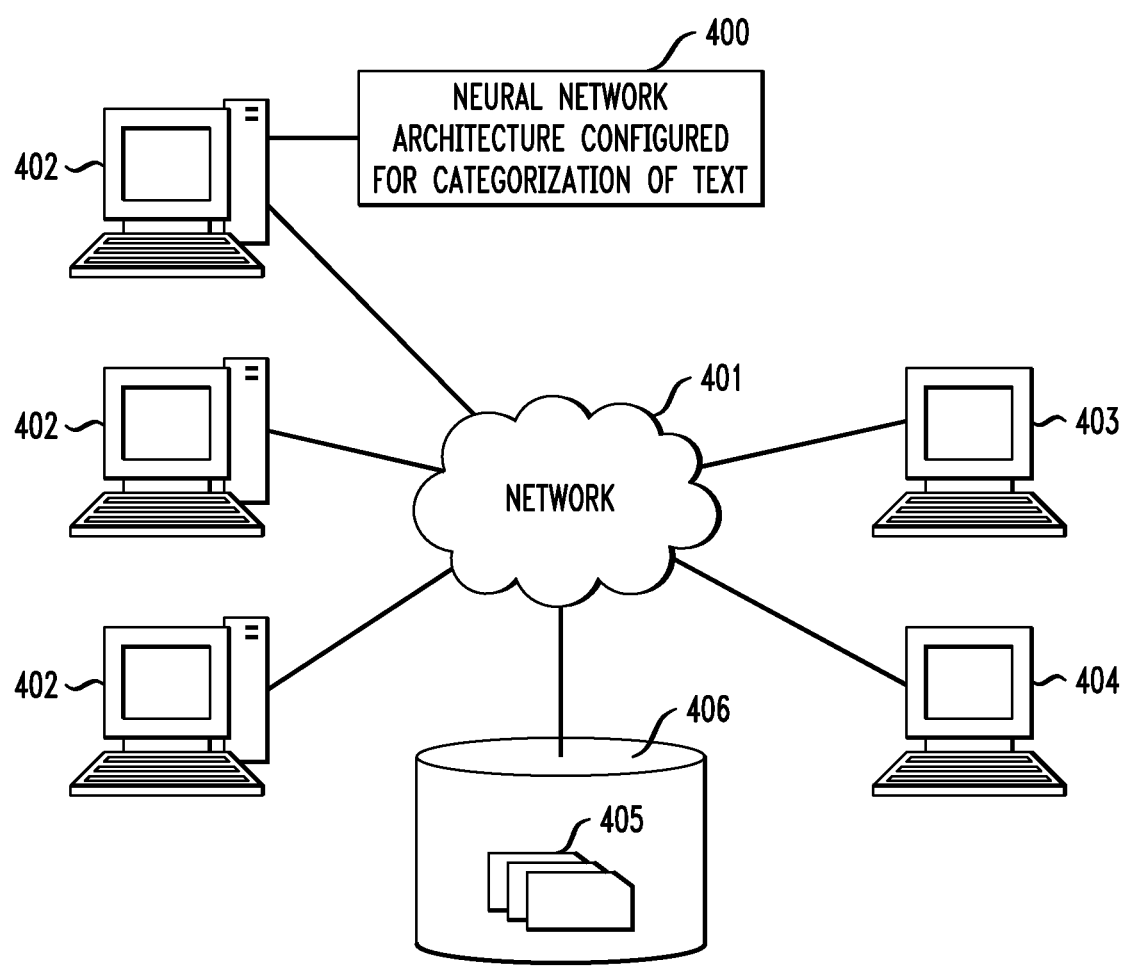
FIG. 4 depicts a schematic diagram of a system implementing a neural network architecture according to some embodiments of the present invention.

According to some embodiments of the present invention, a neural network architecture configured for categorization of text is provided, which enables a natural language processing system to categorize input text. FIG. 4 depicts a schematic diagram of an exemplary embodiment of a neural network architecture 400 disposed in communication with a computer network 401. The neural network architecture 400 is implemented on one or more computing devices 402. The computer network 401 connects the computing devices 402, which include one or more processors and one or more memories. According to some embodiments, the computer network 401 connects other computing device elements generally known in the art including buses, storage devices, communication interfaces, and the like. The computer network 401 facilitates communications between connected devices and components via one or more wired and/or wireless data communication links, where each communication link comprises one or more of wires, routers, switches, transmitters, receivers, or the like. The neural network architecture 400 and computer network 401 enables categorization of text input by one or more system users via respective computing devices 403-404. Other embodiments of the neural network architecture 400 may be used with components, systems, sub-systems, and/or devices other than those depicted.

According to at least one embodiment, the neural network architecture 400 receives textual input from various sources. For example, the neural network architecture 400 receives input from the network 401, a corpus of electronic documents 405 (e.g., stored on a database 406), system users 403-404, and/or other data and other possible sources of input. In one embodiment, some or all of the inputs to the neural network architecture 400 are routed through the network 401. The various computing devices 402 on the network 401 include access points for content creators and natural language system users. Some of the computing devices 402 include devices for a database storing the corpus of data 405 (shown as a separate entity in FIG. 4 for illustrative purposes). Portions of the corpus of data 405 can also be provided on one or more other network attached storage devices, in one or more databases, or other computing devices not explicitly shown. The network 401 includes local network connections and remote connections in various embodiments, such that the neural network architecture 400 may operate in environments of any size, including local and global, e.g., the Internet.

Recapitulation

According to one or more embodiments of the present invention, a method of training a neural network to classify sparsely labeled text documents while preserving semantics includes receiving a text corpus (301) containing a labeled portion and an unlabeled portion exceeding the labeled portion, extracting a plurality of local n-gram features and a sequence of the local n-gram features from the text corpus (303), processing, using a plurality of convolutional layers, the local n-gram features to determine capsule parameters of a plurality of capsules configured to preserve the sequence of the local n-gram features (305), performing a forward-oriented dynamic routing between the plurality of capsules to extract a plurality of global characteristics of the text corpus (306), and processing the text corpus according to the global characteristics using a long short-term memory layer to extract a plurality of global sequential text dependencies from the text corpus (307), wherein a plurality of parameters of the neural network are updated according to the local n-gram features, the capsule parameters, global characteristics, and global sequential text dependencies.

Once the neural network has been trained (see FIG. 3), the parameters of the neural network can be frozen. The state of the parameters can then be used for further classification tasks. The neural network can be re-trained at a later stage, if desired, using further labeled (e.g., sparsely labeled) input text.

According to one or more embodiments of the present invention, a neural network system executing on a computer system includes a first plurality of processing elements (103) configured to extract a plurality of local features and a sequence of the local features from a text corpus, wherein the text corpus is sparsely labeled, a second plurality of processing elements (104) configured to extract a plurality of global characteristics of a text corpus, wherein the processing elements are structured as capsules configured to preserve the sequence of the local features, and a third plurality of processing elements (203) configured to extract a plurality of global sequential text dependencies from the text corpus given an output of the first plurality of processing elements, wherein the third plurality of processing elements are structured as a long short-term memory layer, which is configured to output a probability distribution over all labels generated by the first and second plurality of processing elements.

According to an embodiment of the present invention, a method of training a performant text classifier system captures semantic information in text data. The method extracts local (n-gram features) and global characteristics and semantics inside a sentence. Some embodiments of the present invention use virtual adversarial training, which can be used for regularization. In view of the foregoing, embodiments of the present invention are viable in cases of unlabeled training data.

According to one or more embodiments of the present invention, capsules and forward-oriented dynamic routing between those capsules are used to extract global features while preserving sequential dependencies.

According to some embodiments, a combination of convolutional layers, capsule layers and long short-term memory layer is used to extract semantic sequence features (global features).

According to at least one embodiment of the present invention, word sequences in sentences are preserved through forward-oriented dynamic routing between capsules, with connections between capsules that respect the word sequences.

According to one or more embodiments of the present invention, a neural network models sequential-dependencies of semantics, which preserves word sequences in sentences, and regularizes with regard to adversarial training, making the neural network robust against noise or perturbations in the text to be classified.

According to some embodiments, the neural network makes use of a forward oriented dynamic routing, enabling unlabeled data to be used to enhance model performance.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 5:
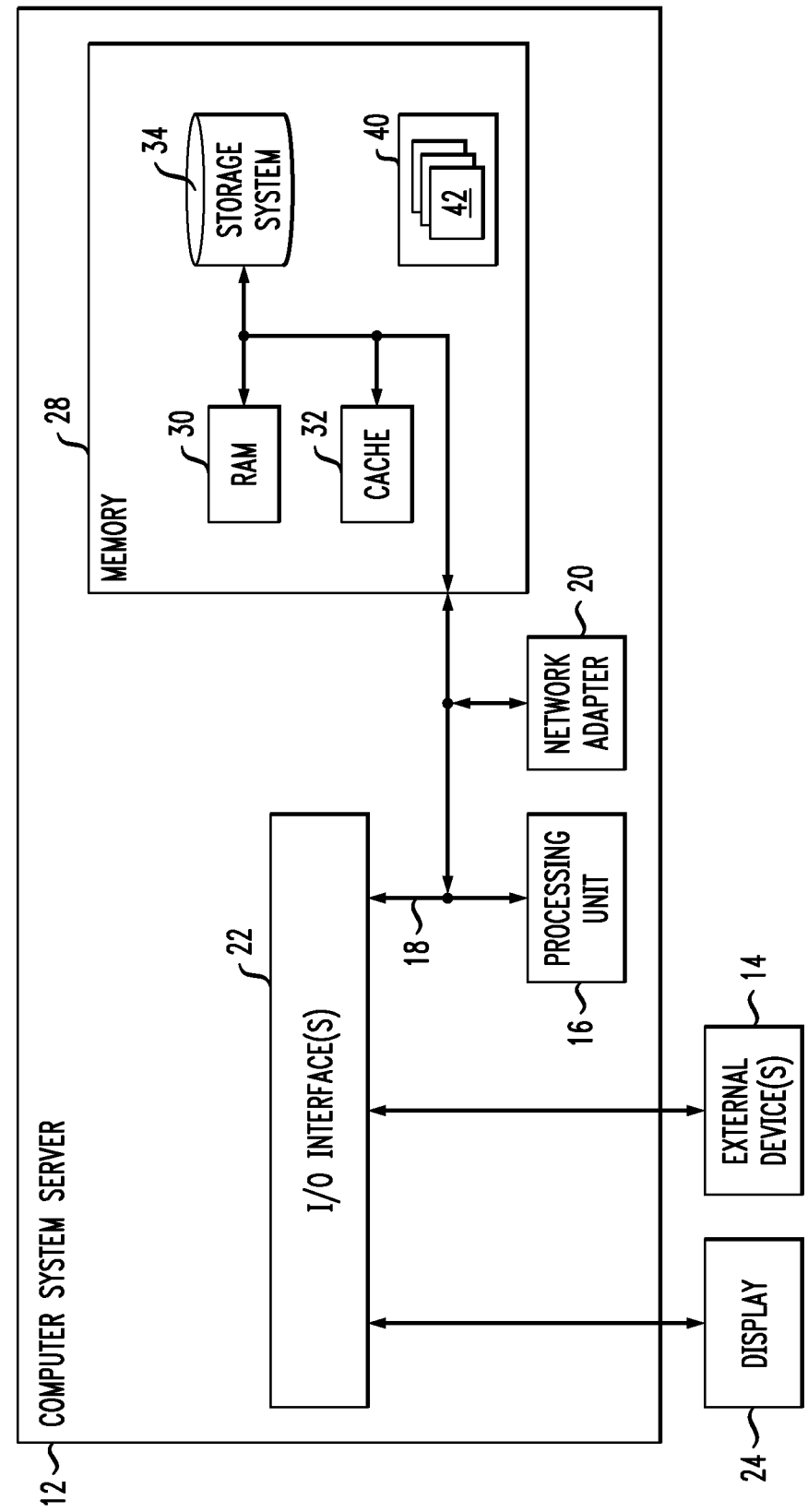
FIG. 5 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of training a neural network to classify sparsely labeled text documents while preserving semantics comprising:

receiving a text corpus containing a labeled portion and an unlabeled portion exceeding the labeled portion;

extracting a plurality of local n-gram features and a sequence of the local n-gram features from the text corpus;

processing the text corpus, using a plurality of convolutional layers, according to the local n-gram features to determine capsule parameters of a plurality of capsules configured to preserve the sequence of the local n-gram features;

performing a forward-oriented dynamic routing between the plurality of capsules using the capsule parameters to extract a plurality of global characteristics of the text corpus; and processing the text corpus according to the global characteristics using a long short-term memory layer to extract a plurality of global sequential text dependencies from the text corpus, wherein a plurality of parameters of the neural network are updated according to the local n-gram features, the capsule parameters, global characteristics, and global sequential text dependencies.

2. The method of claim 1, further comprising:

freezing the parameters of the neural network; and applying the neural network to a newly input text to determine a label according to the parameters of the neural network.

3. The method of claim 1, wherein the forward-oriented dynamic routing has a first layer of the capsules and a second layer of the capsules, and an input of each $n^{th}$ capsule in the second layer is received from outputs of the (1 to $n^{th}$) capsules in the first layer.

4. The method of claim 1, further comprising applying a virtual adversarial training to the neural network to generalize the capsules.

5. The method of claim 4, wherein the virtual adversarial training inputs a plurality of perturbed text data into the neural network, wherein the neural network adapts the capsules to the perturbed text data.

6. The method of claim 1, wherein the neural network comprises a plurality of layers composed of sets convolutional filters, a set of the capsules within the convolutional filters, and the long short-term memory layer.

7. A neural network system executing on a computer system comprising:

a first plurality of processing elements configured to extract a plurality of local features and a sequence of the local features from a text corpus, wherein the text corpus is sparsely labeled;

a second plurality of processing elements configured to extract a plurality of global characteristics of a text corpus, wherein the processing elements are structured as capsules configured to preserve the sequence of the local features; and a third plurality of processing elements configured to extract a plurality of global sequential text dependencies from the text corpus given an output of the first plurality of processing elements, wherein the third plurality of processing elements are structured as a long short-term memory layer, which is configured to output a probability distribution over all labels generated by the first and second plurality of processing elements.

8. The neural network system of claim 7, wherein the first processing elements and the second processing elements are different configurations using the same output of a set of neurons.

9. The neural network system of claim 7, disposed on a computer network to receive input data and output labeled data.

10. A non-transitory, computer-readable storage medium embodying computer program code, the computer program code comprising computer executable instructions configured for training a neural network to classify sparsely labeled text documents while preserving semantics comprising:

receiving a text corpus containing a labeled portion and an unlabeled portion exceeding the labeled portion;

extracting a plurality of local n-gram features and a sequence of the local n-gram features from the text corpus;

processing the text corpus, using a plurality of convolutional layers, according to the local n-gram features to determine capsule parameters of a plurality of capsules configured to preserve the sequence of the local n-gram features;

performing a forward-oriented dynamic routing between the plurality of capsules using the capsule parameters to extract a plurality of global characteristics of the text corpus; and processing the text corpus according to the global characteristics using a long short-term memory layer to extract a plurality of global sequential text dependencies from the text corpus, wherein a plurality of parameters of the neural network are updated according to the local n-gram features, the capsule parameters, global characteristics, and global sequential text dependencies.

11. The non-transitory, computer-readable storage medium of claim 10, further comprising:

freezing the parameters of the neural network; and applying the neural network to a newly input text to determine a label according to the parameters of the neural network.

12. The non-transitory, computer-readable storage medium of claim 10, wherein the forward-oriented dynamic routing has a first layer of the capsules and a second layer of the capsules, and an input of each nth capsule in the second layer is received from outputs of the (1 to nth) capsules in the first layer.

13. The non-transitory, computer-readable storage medium of claim 10, further comprising applying a virtual adversarial training to the neural network to generalize the capsules.

14. The non-transitory, computer-readable storage medium of claim 13, wherein the virtual adversarial training inputs a plurality of perturbed text data into the neural network, wherein the neural network adapts the capsules to the perturbed text data.

15. The non-transitory, computer-readable storage medium of claim 10, wherein the neural network comprises a plurality of layers composed of sets convolutional filters, a set of the capsules within the convolutional filters, and the long short-term memory layer.

\* \* \* \* \*